51-284 R 40 323 EX
5/28/85 DR RE 31,897

United States Patent [19]

Johnson

[11] E Patent Number: Re. 31,897

[45] Reissued Date of Patent: May 28, 1985

[54] METHOD FOR THE ALTERATION OF A LENS

[75] Inventor: Dee Lynn Johnson, Woodbury, Minn.

[73] Assignee: Minnesota Mining and Manufacturing Company, St. Paul, Minn.

[21] Appl. No.: 906,745

[22] Filed: May 17, 1978

Related U.S. Patent Documents

Reissue of:

[64] Patent No.: 3,962,833
Issued: Jun. 15, 1976
Appl. No.: 563,389
Filed: Mar. 31, 1975

[51] Int. Cl.[3] ..... B24B 1/00; B24B 13/00

[52] U.S. Cl. ..... 51/284 R; 51/216 LP; 51/227 R; 51/323

[58] Field of Search ..... 51/227, 284, 323, 216 LP; 427/207 C, 208; 33/28

[56] References Cited

U.S. PATENT DOCUMENTS

| | | | |
|---|---|---|---|
| 2,437,436 | 3/1948 | Mullen | 51/284 |
| 2,573,056 | 10/1951 | Polinske | 51/277 |
| 2,660,011 | 11/1953 | Bernheim | 51/277 |
| 2,859,568 | 11/1958 | Dantzic | 51/216 LP |
| 2,982,061 | 5/1961 | Dillon | 51/277 |
| 3,140,568 | 7/1964 | Beasley | 51/216 LP |
| 3,277,612 | 10/1966 | Brandt | 51/277 |
| 3,355,342 | 11/1967 | Lanman | 51/284 X |
| 3,488,174 | 1/1970 | Boudet | 51/284 X |
| 3,861,089 | 1/1975 | England | 51/284 |
| 3,921,344 | 11/1975 | Goodwin | 51/284 |

FOREIGN PATENT DOCUMENTS

| | | |
|---|---|---|
| 372171 | 3/1923 | Fed. Rep. of Germany . |
| 1109586 | 4/1968 | United Kingdom . |

*Primary Examiner*—Nicholas P. Godici
*Attorney, Agent, or Firm*—Donald M. Sell; James A. Smith; James V. Lilly

[57] ABSTRACT

A method for altering a lens whereby a lens is securely bonded to a lens block by a lens adhesive blocking pad having means for accurately aligning the optical center, and optionally the cylinder axis, of the lens with the center point and cylinder axis of the lens block. The invention also includes the adhesive lens blocking pad with alignment means.

19 Claims, 15 Drawing Figures

METHOD FOR THE ALTERATION OF A LENS

Figure 1:
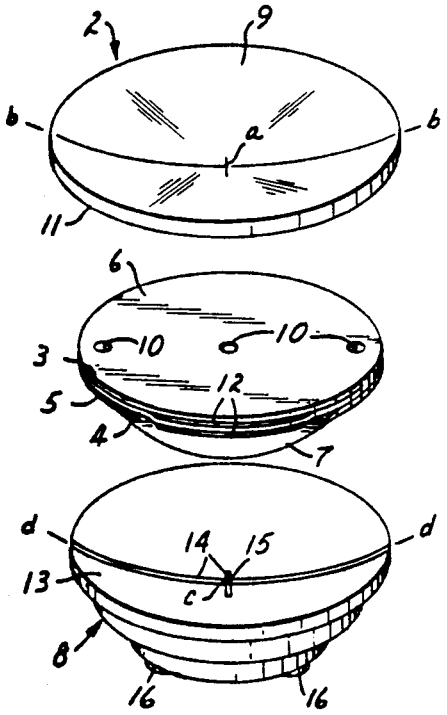

Matter enclosed in heavy brackets [ ] appears in the original patent but forms no part of this reissue specification; matter printed in italics indicates the additions made by reissue.

This invention relates in general to a method and means for altering lenses. More particularly, it relates to a method and means for altering lenses wherein the optical centers and, optionally, cylinder axes of said lenses are easily and accurately located.

The alteration of lenses is a well-known art and includes both the generation of surfaces of lenses, thereby imparting specific optical properties thereto, and the peripheral alteration, or edging, of the shape of lenses. Generally, the first step in altering lenses is the generation of a surface on a semi-finished lens blank (e.g., one that is ground and polished on one of its two faces). Consequently, surface generation is normally done on only the unfinished face of the lens blank. The second step in altering lenses normally is the peripheral alteration of the shape of the surfaces lens.

The lens blanks and surfaced lenses may be provided in a variety of forms. For example they may be spherical, cylindrical, optical flats, aspherical, multi-focal, etc. Moreover, once the lenses have been finished they may be put to a variety of uses such as spectacle lenses, camera lenses, etc.

Surface generation commonly involves a series of steps. For example, the optical center, and optionally the cylinder axis, of the lens blank are located and marked on the face thereof. In those instances when the finished lens will contain at least one symmetrical surface it is not necessary to locate and mark the cylinder axis of the blank. Next, the blank is attached to a lens block by some type of holding means such that the optical center and, optionally the cylinder axis, of the blank are aligned with the center point and cylinder axis of the block. The desired optical properties are then generated upon the upper face of the lens blank by grinding. During generation the temperature of the lens rises. The lens is cooled by a steady flow of a coolant such as a blend of water and ethoxy ethanol ("Ethyl Cellosolve" commercially available from Union Carbide) to prevent it from cracking. After the surface has been generated it is fined with a water slurry of a fine grit abrasive and then polished with a polishing slurry.

Edging the lens to obtain a desired shape involves a series of similar steps. For example, the optical center and, optionally the cylinder axis, of a lens are located and marked on a face thereof if not previously done. In those instances when the lens to be edged contains an asymmetric surface it is necessary that the optical center and cylinder axis of the lens be located and marked thereon. Next, the lens is attached to a lens block by some type of holding means such that the optical center, and optionally the cylinder axis, of the lens are aligned with the center point and cylinder axis of the block. The desired peripheral shape is then imparted to the lens. During edging the temperature of the lens rises. The lens is cooled by a steady flow of a coolant such as a blend of water and ethoxy ethanol ("Ethyl cellosolve" commercially available from Union Carbide) to prevent it from cracking.

Although these methods of surface generation and edging are commonly used, they suffer from various drawbacks. For example, the step of fastening the lens to the surfacing or edging block such that the optical center, and optionally the cylinder axis, of the lens are accurately aligned with the center point and axis of the surfacing or edging block is difficult to perform. Additionally, it is difficult to attach the lens blank to these blocks with a bond that will not fail during alteration yet is easy to break once alteration is complete.

In the past, a variety of methods have been used to accomplish these results. For example, when a surface is to be generated the optical center and cylinder axis of the lens blank are visually aligned with the center point and cylinder axis of a surfacing block by means of marks on said block. The blank is then clamped to the block while a molten metal alloy is pumped into a cavity between the blank and the block and allowed to cool, thereby bonding the two together. This approach, however, has several disadvantages. For example, primers are necessary in order to obtain adequate bonding of the alloy to the lens. Before the alloy can be applied, the primer must dry thereby slowing the overall surface generation process. Moreover, the primers used are often soluble in either the liquid used to cool the lens during surface generation of the water used in the fining and polishing slurries. As a result, the bond between the alloy and the lens is undercut by the action of this liquid.

Additionally, the application of the alloy to the lens in a molten state may produce a thermal pattern in plastic lenses that can only be removed by subsequently thermally annealing the lens at or above the temperature at which the molten alloy was applied. This further slows the overall process. Once applied, the alloy becomes rigid and the bond between it and the lens is easily broken with the slightest flexing of the lens. Should this happen during surface generation, fining or polishing the lens would be damaged, possibly irreparably. Furthermore, the alloy is expensive to use thereby making its recovery an economic necessity and requiring the use of special equipment.

Another method substitutes an epoxy adhesive for the metal alloy. This method also requires the use of primers in order to achieve adequate bonding. Furthermore, the epoxy adhesive requires special equipment in order to mix and apply it. The adhesive cures by an exothermic reaction that may produce a thermal pattern in the lens thereby necessitating a thermal annealing step to remove it. This type of bonding is time consuming and expensive because of the materials used. Moreover, the resultant bond is rigid and is easily broken with the slightest flexing of the lens resulting in the possible loss of the lens.

In another method, pitch is applied in a hot fluid state to the interface between the lens blank and the surfacing block. This method is of only limited usefulness because it is messy, necessitates the use of heat during application, and is difficult to clean-up.

In still another method, an opaque adhesive tape is used to bond the lens blank to the surfacing block. This tape is provided on a paper release liner that is not conformable. Furthermore, the liner is difficult to remove from the tape. This method is of limited usefulness because the tape is either applied to the lens blank before adhering it to the surfacing block or vice versa thereby making it difficult to position the optical center and cylinder axis of the lens over the center point and cylinder axis of the surfacing block. Once the lens has been properly positioned and the lens surface generated, it is often hard to remove the lens for the block.

Generally, it is necessary to pry the lens from the block frequently resulting in breakage or chipping and scratching of the lens.

When the peripheral shape of the lens is to be altered the same metal alloy used to bond the lens to the surfacing block during generation may also be used to bond the lens to an edging block. This method of bonding still suffers from the same disadvantages as it does when used during surface generation.

In another method, edging blocks are clamped to the opposite faces of the lens. The lens and blocks are then placed into an edging device and the peripheral shape of the lens altered as desired. This method suffers from the disadvantage that the lens may slip during edging thereby causing the optical center and cylinder axis to be incorrectly located in the edged lens.

In still another method, a small rectangular pad having an opaque adhesive tape on one surface is adhered to the optical center of the lens. The geometric axis of the long dimension of the pad is aligned with the optical axis of the lens. The pad allows the lens to be positioned between two edging blocks for edging purposes. This pad is useful only for positioning the lens and does not serve to hold the lens during edging.

The present invention overcomes these and other disadvantages of the prior art. It provides a fast, simple, clean, low cost method for the alteration of lens surfaces that does not require the application of heat, the use of primers, or the use of special equipment. It also provides a method whereby the bond between the lens and the surfacing or edging blocks is sufficiently flexible so as to resist bond failure as a result of flexing of the lens while being strong enough to prevent the lens from slipping during alteration. Surprisingly, however, the bond is easily broken when the alterations have been completed. The method of the present invention also provides a means for accurately aligning the optical center, and, optionally the cylinder axis, of the lens with the center point and cylinder axis of the surfacing and edging blocks.

In accordance with the present invention, there is provided the method of altering a lens comprising the steps of alternatively:

A. positioning on one face of a lens a conformable lens adhesive blocking pad having means for accurately aligning the optical center, and optionally the cylinder axis, of the lens with the center point, and the cylinder axis, of a rigid lens block, wherein said pad is centered upon said face;

B. adhesively attaching and conforming said pad to said lens face;

C. positioning and adhesively attaching said lens upon a rigid lens block whereby the optical center, and optionally the cylinder axis, of said lens is accurately aligned with the center point, and the cylinder axis, of said block; or A. positioning and adhesively attaching upon a rigid lens block a conformable lens adhesive blocking pad having means for accurately aligning the optical center, and optionally the cylinder axis, of a lens with the center point, and the cylinder axis, of the rigid lens block, wherein said pad is centered upon said block;

B. aligning the optical center, and optionally the cylinder axis, of said lens with the centerpoint, and the cylinder axis, of said block;

C. adhesively bonding one face of said lens to said pad such that the optical center, and optionally the cylinder axis, of said lens is accurately aligned with the center point, and the cylinder axis, of said block; then D. altering said lens.

Also provided is a novel adhesive blocking pad comprising a conformable substrate having a pressure sensitive adhesive applied to the planar surfaces thereof and having means for accurately aligning the center point, and optionally the cylinder axis, of a lens with the center point, and cylinder axis, of a lens block. The adhesive blocking pad may further have a portion of the edge of at least one of its planar surfaces that is non-tacky and may have removable protective backings adhered to its planar surfaces.

Also provided are methods of removing a lens from a lens block by a variety of means.

Referring now briefly to the Figures:

FIG. 1 is an exploded perspective view of one set of elements useful in the practice of the present invention. The combination is particularly useful during surface generation. It represents but one possible combination of the elements and comprises a lens 2, a lens adhesive blocking pad 4, and a lens block 8.

The lens 2 has upper and lower faces 9 and 11 respectively. The optical center a and a cylinder axis line b—b are marked upon at least one of the faces.

The pad 4 has removable protective backings 6 and 7 adhered to planar surfaces 3 and 5 respectively. It also has alignment means 10 for accurately positioning the pad 4 upon the lens 2 or the block 8. Alignment means 10 also allow the lens 2 to be accurately positioned upon the block 8. The pad 4 also has protective barriers 12 adhered to the surfaces 3 and 5.

The block 8 has top surface 13 with locating means 14 located at the center point c and along the cylinder axis line d—d thereof. Block 8 also has removal means 15 and positioning inserts 16.

Figure 2:
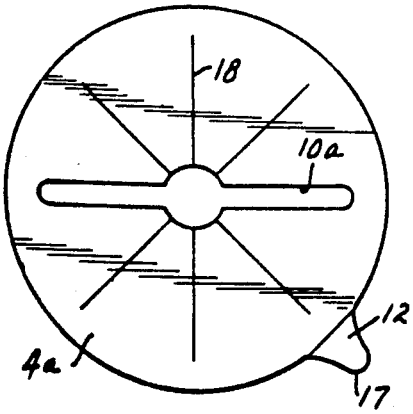

FIG. 2 is a top view of one embodiment of a lens adhesive blocking pad that is particularly useful during surface generation. The pad 4a has alignment means 10a, protective barrier 12, and tab 17. It also has conforming means 18 cut through the pad 4a to assist in conforming said pad to the shape of the surface to which it is applied.

Figure 3:
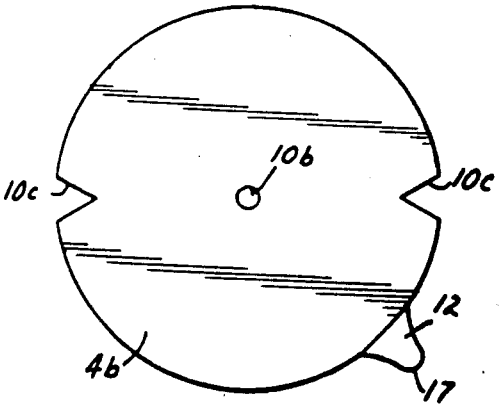

FIG. 3 is a top view of another embodiment of a lens adhesive blocking pad that is particularly useful during lens surfacing. The pad 4b has alignment means 10b comprising a hole, and 10c comprising a notch, protective barrier 12, and tab 17.

Figure 4:
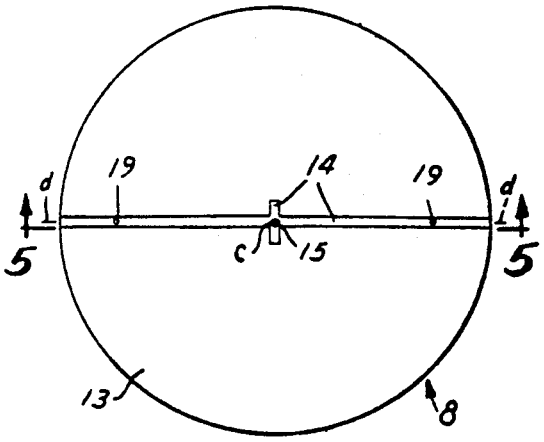

FIG. 4 is a top view of the lens block 8 of FIG. 1. The block 8 has locating means 14 and removal means 15.

Figure 5:
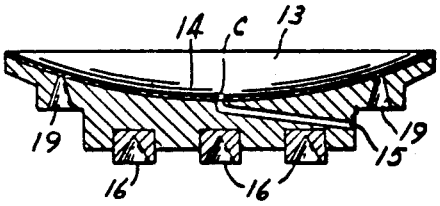

FIG. 5 is a section view of the lens block 8 of FIG. 4 along line 5—5 showing top surface 13, locating means 14, removal means 15, and positioning inserts 16.

Figure 6:
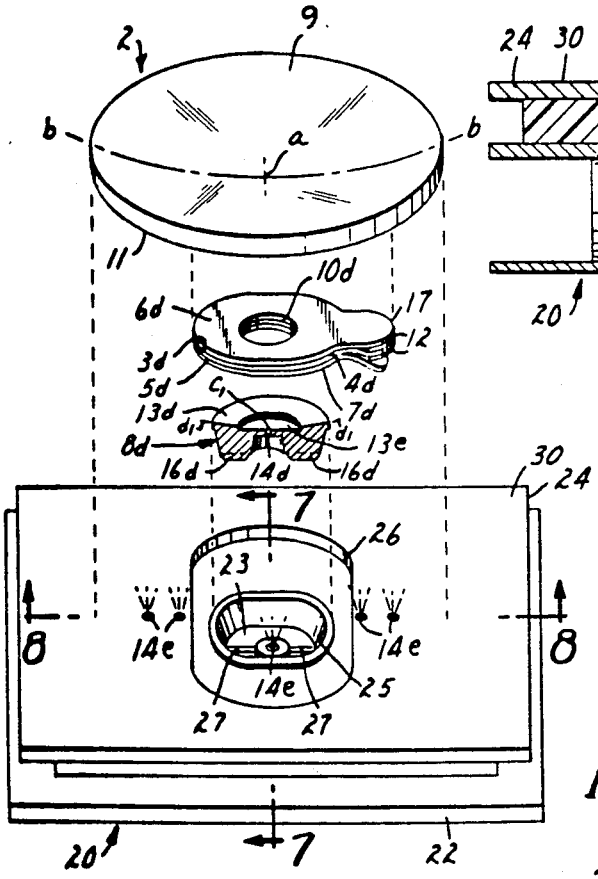

FIG. 6 is an exploded perspective view of another set of elements useful in the practice of the present invention. The combination is particularly useful during lens edging. It represents another possible combination of the elements and comprises a lens 2, a lens adhesive blocking pad 4d, a lens block 8d, and a mounting means 20.

The lens 2 has upper and lower surfaces 9 and 11 respectively. The optical center a and a cylinder axis line b—b are marked upon at least one of the faces.

The pad 4d has removable protective backings 6d and 7d adhered to planar surfaces 3d and 5d respectively. It also has alignment means 10d for accurately positioning the pad 4d upon the lens 2 or the block 8d. Alignment means 10d also allow the lens 2 to be accurately positioned upon the block 8d. The pad 4d also has protective barriers 12 adhered to the surfaces 3d and 5d, at tab 17d.

The block 8d, a portion of which has been cut away, has top curved surface 13d and top flat surface 13e. Locating means 14d is located at the center point $c_1$ of surface 13e. It also has a cylinder axis line located along the line $d_1$—$d_1$. The block 8d also has positioning inserts 16d.

The mounting means 20 comprises a base 22, a mounting block 24, and locating means 14e. Mounting block 24 comprises mounting cavity 25 and cavity 26. Located in the planar base surface 23 of the cavity 25 are positioning insets 27 for mating with positioning inserts 16d and preventing rotational motion of block 8d.

Figure 7:
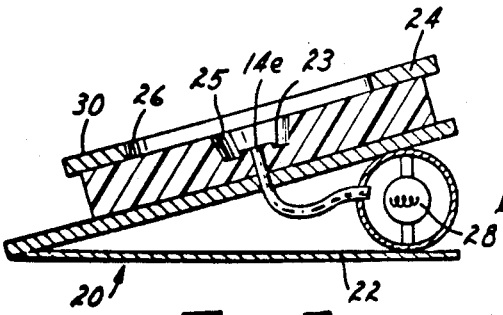

FIG. 7 is a section view of mounting means 20 along the line 7—7 showing locating means 14e, base 22, planar base surface 23 of cavity 25, mounting block 24, cavities 25 and 26, and illuminating means 28.

Figure 8:
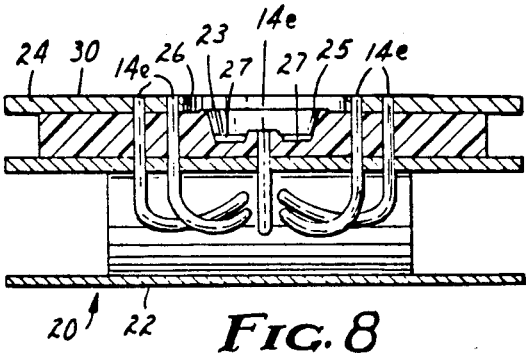

FIG. 8 is a section view of mounting means 20 along the line 8—8 showing locating means 14e, base 22, planar base surface 23 of cavity 25, mounting block 24, cavities 25 and 26, and positioning insets 27.

Figure 9:
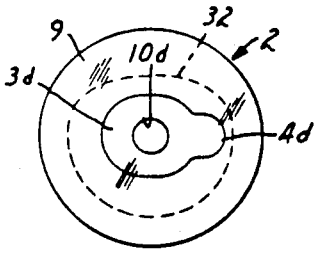

FIG. 9 is a top view of a lens 2 having a lens adhesive blocking pad 4d adhesively conformed to one surface thereof and showing an outline 32 of a desired peripheral shape.

Figure 10:
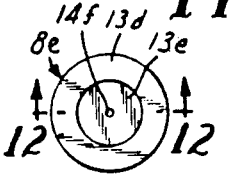

FIG. 10 is a top view of an alternative embodiment of a lens block 8e having top curved surface 13d, top flat surface 13e, and hollow locating means 14f. This block is particularly useful in lens edging.

Figure 11:
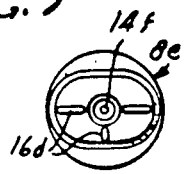

FIG. 11 is a bottom view of the block 8e of FIG. 10 having hollow locating means 14f and positioning inserts 16d.

Figure 12:
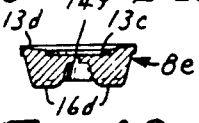

FIG. 12 is a section view of block 8e along the line 12—12 showing hollow locating means 14f, and positioning insets 16d.

Figure 13:
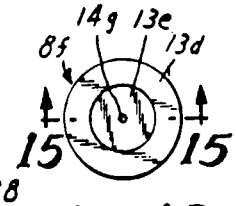

FIG. 13 is a top view of another embodiment of a lens block 8f. It has top curved surface 13d, top flat surface 13e, and pointed locating means 14g. This block is particularly useful in lens edging.

Figure 14:
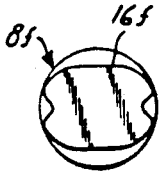

FIG. 14 is a bottom view of the lens block 8f of FIG. 13 having an irregularly shaped base as the positioning insert.

Figure 15:
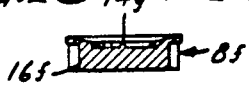

FIG. 15 is a section view of block 8f along the ling 15—15 showing pointed locating means 14g.

The practice of the present invention may be easily accomplished and will be better understood by reference to FIG. 1. In one embodiment of the present invention one of the protective backings 6 or 7 are removed from pad 4. The pad 4 is then positioned on face 11 of lens 2 so that alignment means 10 are aligned with the optical center a, and optionally the cylinder axis line b—b, of lens 2 and the pad 4 is centered upon the surface 11 of lens 2. Once positioned the pad 4 is attached and adhesively conformed to surface 11 of lens 2. The other protective backing 6 or 7 is then removed from the pad 4. The lens 2 (with pad 4 attached thereto) is then positioned and adhesively attached to the lens block 8 such that the optical center a, and optionally the cylinder axis line b—b, of the lens 2 are accurately aligned with the center point c and cylinder axis line d—d of the block 8.

In any event the lens 2 may then be altered as desired. The lens 2 may then be removed from the block 8. When this procedure is employed the alteration preferably comprises surface generation. The pad 4 and the block 8 used during surface generation may be referred to as the lens adhesive surfacing pad and the lens surfacing block respectively.

Another embodiment of the present invention may be better understood by reference to FIG. 6. In this embodiment one of the protective backings 6d or 7d are removed from pad 4d. The pad 4d is then positioned on face 11 of lens 2 so that alignment means 10d are aligned with the optical center a of the lens 2 and centered upon the surface 11 of lens 2. Preferably the pad 4d is of a diameter such that the cylinder axis line b—b of the lens 2 may be seen beyond the periphery of the pad 4d. Once positioned the pad 4d is attached and adhesively conformed to surface 11 of lens 2. The other protective backing 6d or 7d is then removed from the pad 4d. The lens 2 (with the pad 4d attached thereto) is then positioned and adhesively attached to the lens block 8d such that the optical center a, and optionally the cylinder axis line b—b, of the lens 2 are accurately aligned with the center point $c_1$ , and cylinder axis line $d_1$—$d_1$ of the block 8d as it rests in mounting cavity 26.

Alternatively pad 4d may first be positioned and adhesively attached to lens block 8d such that the alignment means 10d are aligned with the center point $c_1$ of the block 8d and is centered upon surface 13d of block 8d. The optical center a, and optionally the cylinder axis line b—b, of the lens 2 are then aligned with the center point $c_1$ and the cylinder axis line $d_1$—$d_1$ of the block 8 as it rests in mounting cavity 26. The lens 2 is then adhesively bonded to the pad 4d such that the optical center a, and optionally the cylinder axis line b—b of the lens 2 are accurately aligned with the center point $c_1$ and cylinder axis line $d_1$—$d_1$ of block 8d.

In any event the lens 2 may then be altered as desired. The lens 2 may then be removed from the block 8d. When this procedure is used the alteration preferably comprises alteration of the peripheral shape (e.g., edging) of the lens. The pad 4d and the block 8d used during edging may be referred to as the lens adhesive edging pad and the lens edging block respectively.

The lens 2 may be a single or multi-focal lens or other optical element. It may be made from a variety of materials such as glass or plastic (e.g. polydiallyglcol carbonate polycarbonate, polymethylmethacrylate, etc.). The base curvature of the lens 2 may vary and still not affect the process of the present invention. Thus, for example, the surface 11 of the lens 2 may be convex (as shown), concave, cylindrical or flat. Furthermore, the surface 11 may contain steps so that stepped multifocal lenses can be produced.

The pad 8 or 8d preferably comprises a double-sided tape (that is one having adhesive applied to the planar surfaces thereof). Preferably the adhesive comprises a pressure-sensitive adhesive. Removable protective backings 6 and 7 or 6d and 7d are provided to prevent adhesion of the pad 4 or 4d to undesired surfaces. The pad 4 or 4d is thick enough, (e.g. from about 0.2 to 2.0 millimeters) soft enough, and flexible enough to allow firm bonding of lens 2 when its base curvature approximates but does not identically match the base curvature of surface 13 or 13d of blocks 8 or 8d.

Alternatively the pad 4 or 4d may comprise a non-adherant material that is thick enough (e.g., from about 0.2 to 2.0 millimeters), soft enough, and flexible enough to conform to the curvature of the lens 2. When a non-adherant material is used an adhesive is provided to adhere the pad 4 or 4d to the lens 2 and to the block 8 or 8d.

The shape of the pad used during lens alteration is not critical in the practice of the present invention. Consequently it may have a variety of forms, some of which are shown in FIGS. 1, 2, 3, and 6. Alternatively it may be rectangular, oval, triangular, etc. Pad 4 or 4d must, however, be of a size to furnish an adhesive area large enough to provide a firm bond between the lens 2 and the block 8 or 8d and prevent rotational motion of the lens 2 while not interfering with the particular alteration step being employed. Thus, the pad utilized during surface generation may be of any size, although it is preferred that no dimension of said pad be larger than that of the lens being surfaced. The pad utilized during edging may also be of any size although it is preferred that said pad be able to be positioned and adhered to lens 2 such that no part of said pad extends beyond the desired outline to the final peripheral shape of said lens. This latter preferred arrangement is illustrated in FIG. 9. It has been found that round pads having a diameter of from about ½ to ¼ of the diameter of lens 2 are particularly well suited for the lens edging process.

The shape of the alignment means 10 and 10a–d employed in the pad 4 or 4d is not critical to the practice of the present invention. Consequently the alignment means 10 and 10a–d may have a variety of shapes, some of which are shown in FIGS. 1, 2, 3, and 6. Alternatively they may comprise rectangles, triangles, ovals, etc. Additionally the size of the alignment means 10a–d is not critical to the practice of the present invention provided, however, that they be large enough to allow the pad 4 or 4d to be easily positioned on the lens 2 or the block 8 or 8d while leaving sufficient adhesive area on the pad 4 or 4d to provide a good bond between the lens 2 and the block 8 or 8d. It has been found that round openings at the center of the pad and being from about 0.2 to 1.5 centimeters in diameter are particularly useful as alignment means in pads useful during lens edging.

The material comprising the pad 4 or 4d may be an opaque or translucent substance. When it is opaque, alignment means 10, 10a, 10b, and 10d comprises an opening cut through the center of the backings 6 and 7 or 6d and 7d and the pad 4 or 4d so that the optical center a of the lens 2 or the center point c or $c_1$ of the block 8 or 8d is visible when the pad is applied. Additionally the alignment means 10, 10b, and 10c may be provided that comprises an opening cut through the backings 6 and 7 or 6d and 7d and the pad 4 or 4d along at least one radius of said pad so that, if necessary, the cylinder axis line b—b of the lens 2 or the block 8 or 8d is visible when the pad 4 or 4d is applied. If the cylinder axis line b—b and the cylinder axis line d—d or $d_1$—$d_1$ are visible after application of the pad 4 or 4d to either the lens 2 or the block 8 or 8d then alignment means need only be provided at the center of pad 4 or 4d.

When the material comprising the pad 4 or 4d is a translucent substance the orientation means comprise the pad itself and no perforations are necessary in said pad. As it is used throughout this specification the term translucent substance means one through which things are easily observed.

The adhesive used on pad 4 or 4d must allow easy removal of removable protective backings 6 and 7 or 6d and 7d therefrom yet provide a firm bond between the lens 2 and the block 8 or 8d. Additionally, the bond provided will preferably be resistant to the liquids used to cool the lens 2 during alteration.

Representative examples of opaque double-sided adhesive tapes that are useful as the adhesive blocking pad 4 or 4d include polychloroprene based pressure-sensitive tape such as "Scotch Brand" Y-4282 tape (commercially available from Minnesota Mining and Manufacturing Company); polyethylene base pressure-sensitive tape such as Scotch Brand Y-4622 tape (commercially available from Minnesota Mining and Manufacturing Company); and polyurethane base pressure-sensitive tape such as Scotch Brand Y-4032 tape (commercially available from Minnesota Mining and Manufacturing Company). Representative examples of translucent double-sided adhesive tapes that are useful as the adhesive blocking pad 4 or 4d include styrene-butadiene block copolymer base pressure-sensitive tape such as Scotch Brand Y-949 tape (commercially available from Minnesota Mining and Manufacturing Company).

The removable protective backings 6 and 7 or 6d and 7d prevent pad 4 or 4d from adhering to surfaces prior to use and are easily removed from the pad.

The backings 6 and 7 or 6d and 7d may comprise a variety of materials such as a paper treated with a release agent such as silicone, or alternatively a conformable (e.g. one that can be formed to the shape of a surface) material (e.g. polyethylene, polyvinyl chloride, etc.).

The removable protective backings may be the same size as the pad or they might be larger. Additionally they may comprise large sheets having a multiplicity of individual pads between them.

Preferably at least one backing comprises a conformable material having the same size and shape as the pad while the other backing comprises a large sheet having a multiplicity of pads thereon. This allows the user to remove the pad from the large sheet, apply it to the lens or block, conform it to the shape of the lens or block without substantial wrinkling or bubbling, then remove the conformable backing from the other surface of the pad.

The pad 4 or 4d preferably has a portion of the edge of at least one of its planar surfaces 6 and 7 or 6d and 7d that is non-tacky. This acts as a protective barrier 12 preventing the protective backings 6 and 7 or 6d and 7d from adhering to the pad 4 or 4d thereby allowing a corner of the backings to be easily grasped so that they may be easily removed from the pad. The barrier 12 also prevents that portion of the pad 4 or 4d from adhering to the lens 2 or the block 8 or 8d thereby allowing a similar simple procedure to be used to allow the pad 4 or 4d to be removed from the lens 2 or block 8 or 8d.

The barrier 12 may comprise a variety of materials. For example, it may comprise an adhesive tape having adhesive applied to only one surface thereof. In this instance the adhesive side of the barrier will be adhered to the planar surface of the pad. Alternatively the barrier 12 may comprise a paper liner, or talc, cloth, etc. The barrier 12 may also comprise a portion of the edge of the planar surface of the pad that has had no adhesive applied thereto, such as by skip coating.

Preferably the barrier 12 is applied to the edge of at least one of the planar surfaces of pad 4 or 4d at tab 17. Tab 17 provides an easy location for a user to grasp the pad 4 or 4d both when positioning it before and removing it after alteration of lens 2.

The pad 4 or 4d may be prepared by a variety of methods. For example, it may be prepared by die cutting (e.g., rotary or ruling, etc.) the material selected for use. It may also be prepared by means of a punch press.

Other methods of preparation will be obvious to those skilled in the art as a result of this disclosure.

The block 8 or 8d may be designed to fit commercially available surface generation and edging devices. It may be constructed from any rigid material such as brass, steel, aluminum, zinc, alloys, plastic, filled plastic, etc. Additionally, the curvature of the upper surface 13 or 13d of the block 8 or 8d may vary so that blocks 8 or 8d may be produced that can accomodate lenses having varying base curvature. Thus, for example, the surface 13 or 13d may be concave (as shown), convex, cylindrical or flat. The surface 13 or 13d may also contain steps so that stepped multifocal lenses can be accomodated.

Generally, the block 8 or 8d will have a size large enough to provide a firm base for lens 2 during alteration while not interfering with the particular alteration step being employed. Thus the block utilized during surface generation may be of any size although it is preferred that it be approximately the same size as the pad being employed. The block utilized during edging may also be of any size although it is preferred that it be approximately the same size as the pad being employed and be able to be positioned under lens 2 such that no part of said block extends beyond the desired outline of the final peripheral shape of the lens 2. It has been found that round blocks having a diameter of from about ½ to ¼ of the diameter of lens 2 are particularly well suited for the lens edging process.

Locating means, such as locating means 14, 14d, 14f, and 14g, are provided in the base 13 or 13e of block 8 or 8d so that the optical center a and cylinder axis line b—b of the lens 2 may be accurately aligned with the center point c or $c_1$ and cylinder axis line d—d or $d_1$—$d_1$ of the block 8 or 8d. The locating means may comprise a variety of devices. For example, it may comprise a line permanently marked upon the surface 13 or 13e such as by painting, mechanical engraving, dying, etc., a depression, or a projection. It may also comprise a channel or a hole in the surface 13 or 13e of the block 8 or 8d and filled flush therewith with a material that transmits light from a light source. Such materials, also known as light guides, may be made from a variety of materials such as polyesters, epoxies, polymethylmethacrylate, etc. The locating means may be of any size provided, however, that it be sufficiently sharp in definition such that when the optical center a, and optionally the cylinder axis line b—b of the lens 2 are aligned with the center point c or $c_1$ and cylinder axis line d—d or $d_1$—$d_1$ of the block 8 or 8d parallax error is substantially absent. Preferably, the locating means is from about 0.2 to 2.0 millimeters wide.

It has been found that a block 8 that is particularly useful during surface generation has a locating means 14 comprising a channel filled with a light guide and is shown in FIGS. 4 and 5. The locating means 14 goes from one edge of block 8 to the other edge of block 8 along a diameter thereof. Preferably, the locating means 14 comprises a channel filled with light-transmitting means that goes from one edge of the block 8 to the other edge of the block 8 along a diameter thereof. Another channel filled with light-transmitting means at 90° angle to the first channel and along a diameter of the block 8 is also provided for locating the optical center a of the lens 2. The second channel may go from one edge of the block 8 to the other but it does not have to do so. Locating means 14 is illuminated by means of a light source, such as a light bulb, located directly beneath shaft 19 prior to alignment of the optical center a, and optionally the cylinder axis line b—b, of lens 2 with the center point $c_1$ and cylinder axis lind d—d of block 8. Preferably the shaft is filled with the light guide used in locating means 14.

The block 8 also has removal means 15 comprising an opening through the block 8. The opening provides a simple means by which the lens 2 may be removed from the block 8. The procedure for such removal is discussed more fully below.

It has been further found that a block 8d that is particularly useful during lens edging has a locating means 14d comprising a hole through the centerpoint $c_1$. The hole may be empty or, alternatively, it may be filled with a light guide. In either event the locating means 14 is illuminated by means of a light source, such as a light bulb, prior to alignment of the optical center a, and optionally the cylinder axis line b—b of lens 2 with the center point $c_1$ and cylinder axis line $d_1$—$d_1$ of the block 8d.

FIGS. 10 through 15 illustrate alternative embodiments of blocks that are particularly useful in the lens edging process. FIG. 10 shows a top view of block 8e having locating means 14f comprising a hole in the center point of the block 8e. FIG. 11 shows a bottom view of block 8e having positioning inserts 16d comprising elongate mounds. FIG. 12 shows a section view of block 8e along line 12—12. FIG. 13 shows a top view of block 8f having locating means 14g comprising a raised point at the center point of block 8f. FIG. 14 shows a bottom view of block 8f having positioning insert 16f comprising an irregularly shaped base. FIG. 15 is a section view of block 8 along line 15—15.

It has also been found that a mounting means 20 is particularly useful in aligning the optical center a, and optionally the cylinder axis line b—b, of lens 2 with the center point $c_1$ and cylinder axis line $d_1$—$d_1$ of block 8d. One embodiment of the mounting means 20 is shown in FIGS. 6, 7, and 8. It comprises a base 22, a mounting block 24 attached to base 22 at an angle, and locating means 14f connected to illuminating means 28 (e.g., a light bulb).

The base 22 and the mounting block 24 may be constructed from the same materials as the block 8d. The mounting block 24 is attached to the base 22 at an angle to enable the user to comfortably employ mounting means 20 to accurately align lens 2 with block 8d. Cavities 25 and 26 are provided in mounting block 24 to further aid in accurate alignment of the lens 2 and block 8d.

Cavity 25 is designed to mate with edging block 8d and prevent it from rotating while lens 2 is being mounted thereon. Accordingly it has positioning insets 27 located in its planar base surface 23 that mate with positioning inserts 16 on edging block 8d.

When block 8d is positioned in cavity 25 its upper surface 13d is equal to or slightly above the level of upper surface 30 of the mounting block 24. This enables the surface 11 of lens 2 to be in close proximity to surface 30 once said lens has been positioned on block 8d thereby assisting in substantially reducing parallax error when the optical center a, and optionally cylinder axis line b—b of the lens 6 are aligned with the center point $c_1$ and cylinder axis line $d_1$—$d_1$ of block 8 by means of locating means 14e.

Locating means 14e may comprise a variety of devices. For example, it may comprise a line or series of marks permanently marked upon surface 30 such as by painting, mechanical engraving, dying, etc. It may also comprise a channel filled flush with surface 30 with a light transmitting material. It may also comprise holes drilled through the mounting block 24 and connected to an illuminating means 28 by means of a light guide or a fiber optic (e.g., an annular material that transmits light from a light source by refraction but without permitting substantial diffusion of the light). Preferably the locating means 14e comprises a fiber optic. Alternatively it may comprise holes drilled through the mounting block 24 having a light bulb located directly beneath it.

After alteration, lens 2 may be removed from the block by a variety of methods. For example, the lens may be pried from the block. However, this method has the disadvantage that the lens 2 is often damaged (e.g., chipped, scratched, broken, etc.) by the act of prying. This method can be facilitated by immersing the lens and block in hot water (e.g., temperature about 100° C.) for a short period of time (e.g., 15 seconds). However, some plastic lens materials cannot withstand such temperatures.

Another method of lens removal that is particularly useful involves the use of fluid means (e.g. pneumatic or hydraulic fluids). Reference to FIG. 5 will facilitate an understanding of this removal technique. In this technique the fluid is forced against the surface 5 of the pad 4 through means 15 thereby reducing the force holding the pad 4 to the lens 2 or block 8. Generally, about 1 to 2 atmospheres of fluid guage pressure are sufficient to reduce the holding force such that the lens 2 may be easily separated from the block 8. While this method has been described with reference to FIG. 5 wherein a lens block particularly useful during surface generation is shown, it is also useful for removal of lens blocks that are particularly useful during edging.

The fluid used to effect removal may comprise a gas or liquid. Preferably, it will be nontoxic and will be inert toward the lens block, the blocking pad, and the lens. Representative examples of useful gases for pneumatic lens removal include air, nitrogen, carbon dioxide, helium, and fluorocarbon gases, etc. Representative examples of useful liquids for hydraulic lens removal include water, hydraulic oils, mineral oils, fluorocarbon liquids, etc. Preferred fluids are water and air.

Another method of lens removal that is also particularly useful may be better understood by reference to FIG. 6. In this method tab 17d is pulled in the direction of the plane of pad 4d thereby causing a reduction in the thickness of pad 4d and a progressive disengagement of pad 4d from the interface between lens 2 and block 8d.

In another useful method, removal may be accomplished by placing the combination of lens 2, pad 4d and block 8d into cavity 25 of mounting block 24 and then rotating the lens 2 and the block 8d in opposite directions with respect to each other thereby causing them to separate. A specially designed tool (not shown) may also be provided to accomplish this same result. The tool is not as wide as the mounting block 24 and facilitates removal by making it easier to grasp the edge of the lens 2.

Once the lens 2 and the block 8 or 8d have been separated, the pad 4 or 4d may be removed from the lens 2 or the block 8 or 8d by simply stripping it therefrom. In addition to providing a method of removal that does not damage the lens 2, these useful techniques also provide methods whereby there is little or no residue left on the lens 2 or block 8 thereby necessitating very little or no clean up.

I claim:

[1. The method of altering a lens comprising the steps of:

A. aligning the center of a conformable lens adhesive blocking pad with the optical center of said lens, wherein said pad comprises a conformable substrate having a pressure sensitive adhesive applied to the planar surfaces thereof and means for accurately aligning the center of said pad with the optical center of said lens, whereby the center of said pad is aligned with the optical center of said lens through said alignment means;

B. adhesively attaching and conforming said pad to one face of said lens in said aligned condition;

C. aligning the optical center of said lens with the center point of a rigid lens block, whereby said alignment is carried out through the alignment means of said pad attached to said lens;

D. adhesively attaching said lens to said block in said aligned condition by means of said pad; and E. altering said lens.]

[2. The method of altering a lens comprising the steps of:

A. aligning the center of a conformable lens adhesive blocking pad with the center point of a rigid lens block, wherein said pad comprises a conformable substrate having a pressure sensitive adhesive applied to the planar surfaces thereof and means for accurately aligning the center of said pad with the center point of said rigid lens block, whereby the center of said pad is aligned with the center point of said block through said alignment means;

B. adhesively attaching said pad to said block in said aligned condition;

C. aligning the optical center of said lens with the center point of said block, whereby said alignment is carried out through said alignment means;

D. adhesively attaching one face of said lens to said pad in said aligned condition; and E. altering said lens.]

[3. The method of altering a lens comprising the steps of:

A. aligning the center and cylinder axis of a conformable lens adhesive blocking pad with the optical center and cylinder axis of said lens, wherein said pad comprises a conformable substrate having a pressure sensitive adhesive applied to the planar surfaces thereof and means for accurately aligning the center and cylinder axis of said pad with the optical center and cylinder axis of said lens whereby the center and cylinder axis of said pad is aligned with the optical center and cylinder axis of said lens through said alignment means;

B. adhesively attaching and conforming said pad to one face of said lens in said aligned condition;

C. aligning the optical center and cylinder axis of said lens with the center point and cylinder axis of a rigid lens block, whereby said alignment is carried out through the alignment means of said pad attached to said lens;

D. adhesively attaching said lens to said block in said aligned condition by means of said pad; and E. altering said lens.]

4. The method of claim [3] *29* wherein a portion of the edge of at least one planar surface of said pad is non-tacky.

5. The method of claim [3] *29* wherein said lens adhesive blocking pad comprises an opaque material having a pressure sensitive adhesive applied to the planar surfaces thereof and wherein said aligning means comprise a perforation in the center thereof.

6. The method of claim 5 wherein said aligning means further comprise a perforation along a radius thereof.

7. The method of claim 5 wherein said pad comprises polychloroprene tape.

8. The method of claim [3] *29* wherein said lens blocking adhesive pad comprises a translucent material having a pressure sensitive adhesive applied to the planar surfaces thereof.

9. The method of claim 8 wherein said pad comprises styrene-butadiene block copolymer.

10. The method of claim [3] *29* wherein said altering comprises the generation of a surface upon the other face of said lens.

11. The method of claim [3] *29* wherein said altering comprises the peripheral alteration of the shape of said lens.

12. The method of claim [3] *29* wherein there is further included the step of removing said lens from said block.

13. The method of claim 12 wherein said removal is effected by pneumatic means.

14. The method of claim 13 wherein said pneumatic means comprises air.

15. The method of claim 12 wherein said removal is effected by hydraulic means.

16. The method of claim 15 wherein said hydraulic means comprises water.

17. The method of claim 12 wherein said removal is effected by pulling an edge of said pad in the plane of said pad until said lens is removed from said block.

18. The method of claim 12 wherein said removal is effected by rotating said lens and said block in opposite directions with respect to each other.

[19. A lens adhesive blocking pad comprising a conformable substrate having a pressure sensitive adhesive applied to the planar surfaces thereof and having means for accurately aligning the center point and cylinder axis of a lens with the center point of a lens block.]

[20. A lens adhesive blocking pad according to claim 19 wherein said substrate comprises an opaque material and said aligning means comprise perforations.]

[21. A lens adhesive blocking pad according to claim 20 wherein said aligning means comprise a perforation in the center thereof.]

[22. A lens adhesive blocking pad according to claim 21 wherein said aligning means further comprise a perforation along a radius thereof.]

[23. A lens adhesive blocking pad according to claim 20 wherein a portion of the edge of at least one of the planar surfaces of said pad is non-tacky.]

[24. A lens adhesive blocking pad according to claim 23 wherein a conformable protective backing is applied to at least one of the planar surfaces of said pad.]

[25. A lens adhesive blocking pad according to claim 19 wherein said substrate comprises a translucent material.]

[26. The method of altering a lens comprising the steps of:

A. aligning the center and cylinder axis of a conformable lens adhesive blocking pad with the center point and cylinder axis of a rigid lens block, wherein said pad comprises a conformable substrate having a pressure sensitive adhesive applied to the planar surfaces thereof and means for accurately aligning the center and cylinder axis of said pad with the center point and cylinder axis of said rigid lens block, whereby the center and cylinder axis of said pad is aligned with the center point and cylinder axis of said block through said alignment means;

B. adhesively attaching said pad to said block in said aligned condition;

C. aligning the optical center and cylinder axis of said lens with the center point and cylinder axis of said block, whereby said alignment is carried out through said alignment means;

D. adhesively attaching one face of said lens to said pad in said aligned condition; and E. altering said lens.]

*27. The method of altering a lens comprising the steps of:* a. adhesively attaching and conforming a conformable lens adhesive blocking pad to one face of a lens, wherein said blocking pad comprises a conformable substrate having a pressure sensitive adhesive applied to the planar surfaces thereof and alignment means therein, and wherein the optical center of said lens is visible through said alignment means;

*b. visually aligning the optical center of said lens with the center point of a rigid lens block through said alignment means;*

*c. adhesively attaching said lens to said block in the aligned condition by means of said pad; and*

*d. altering said lens.*

*28. The method of altering a lens comprising the steps of:*

*a. adhesively attaching and conforming a conformable lens adhesive blocking pad to a rigid lens block, wherein said blocking pad comprises a conformable substrate having a pressure sensitive adhesive applied to the planar surfaces thereof and alignment means therein, and wherein the center point of said lens block is visible through said alignment means;*

*b. visually aligning the optical center of a lens with the center point of said block, through said alignment means;*

*c. adhesively attaching one face of said lens to said pad in the aligned condition; and*

*d. altering said lens.*

*29. The method of altering a lens comprising the steps of:*

*a. adhesively attaching and conforming a conformable lens adhesive blocking pad to one face of a lens, wherein said blocking pad comprises a conformable substrate having a pressure sensitive adhesive applied to the planar surfaces thereof and alignment means therein, and wherein the optical center and cylinder axis of said lens is visible through said alignment means;*

*b. visually aligning the optical center and cylinder axis of said lens with the center point and cylinder axis of a rigid lens block through said alignment means;*

*c. adhesively attaching said lens to said block in the aligned condition by means of said pad; and*

*d. altering said lens.*

*30. The method of altering a lens comprising the steps of:*

*a. adhesively attaching and conforming a conformable lens adhesive blocking pad to a rigid lens block, wherein said blocking pad comprises a conformable substrate having a pressure sensitive adhesive applied to the planar surfaces thereof and alignment means therein, and wherein the center point and cylinder axis of said lens block is visible through said alignment means;*

*b. visually aligning the optical center and cylinder axis of a lens with the center point and cylinder axis of said block through said alignment means;*

*c. adhesively attaching one face of said lens to said pad in the aligned condition; and*

*d. altering said lens.*

* * * * *